United States Patent
Fennessy et al.

(10) Patent No.: US 11,858,648 B2
(45) Date of Patent: Jan. 2, 2024

(54) ADDITIVELY MANUFACTURED CANISTER FOR A NITROGEN GENERATION SYSTEM

(71) Applicant: Hamilton Sundstrand Corporation, Charlotte, NC (US)

(72) Inventors: Colette Opsahl Fennessy, West Hartford, CT (US); Kevin P. Aceves, San Diego, CA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/150,952

(22) Filed: Jan. 6, 2023

(65) Prior Publication Data

US 2023/0150684 A1    May 18, 2023

Related U.S. Application Data (62) Division of application No. 16/422,368, filed on May 24, 2019, now Pat. No. 11,584,537.

(51) Int. Cl.
| | |
|---|---|
| *B64D 37/32* | (2006.01) |
| *B29C 64/153* | (2017.01) |
| *B01D 63/02* | (2006.01) |
| *B33Y 10/00* | (2015.01) |

(Continued)

(52) U.S. Cl.
CPC .......... *B64D 37/32* (2013.01); *B01D 63/021* (2013.01); *B29C 64/153* (2017.08); *B01D 53/22* (2013.01); *B01D 63/02* (2013.01); *B01D 2256/10* (2013.01); *B01D 2257/104* (2013.01); *B01D 2259/4575* (2013.01); *B33Y 10/00* (2014.12); *B33Y 80/00* (2014.12)

(58) Field of Classification Search
CPC ...... B64D 37/32; B29C 64/153; B01D 53/22; B01D 63/02; B01D 2256/10; B01D 2257/104; B01D 2259/4575; B01D 2315/10; B01D 63/021; B33Y 10/00; B33Y 80/00
See application file for complete search history.

(56) References Cited

U.S. PATENT DOCUMENTS

| | | |
|---|---|---|
| 9,802,159 B2 | 10/2017 | Rekow et al. |
| 2017/0015557 A1 | 1/2017 | Daniello |
| 2019/0030460 A1 | 1/2019 | Herring |

(Continued)

FOREIGN PATENT DOCUMENTS

| | | |
|---|---|---|
| DE | 102014222350 A1 | 5/2016 |
| EP | 1820559 A1 | 8/2007 |

(Continued)

OTHER PUBLICATIONS

European Search Report Issued in European Application No. 19210469.3-1104 dated Jul. 15, 2020; 8 Pages.

(Continued)

*Primary Examiner* — Moshe Wilensky
(74) *Attorney, Agent, or Firm* — CANTOR COLBURN LLP (57) ABSTRACT

Disclosed is a method of manufacturing an air separation module (ASM) of a nitrogen generation system (NGS), the method providing: determining an at least partially nonlinear shape between opposing ends of a canister, the canister being configured to fit within an installation envelope for the ASM in the NGS and configured to have installed therein an air separating membrane; and additively manufacturing the canister.

4 Claims, 6 Drawing Sheets

(51) Int. Cl.
    *B33Y 80/00*      (2015.01)
    *B01D 53/22*      (2006.01)

(56)           References Cited

U.S. PATENT DOCUMENTS

2020/0254382  A1    8/2020   Doherty et al.
2020/0369403  A1   11/2020   Fennessy et al.

FOREIGN PATENT DOCUMENTS

EP         3434348  A1    1/2019
WO         9312866  A1    7/1993
WO      2006079782  A2    8/2006

OTHER PUBLICATIONS

Low et al.; "Perspective on 3D Printing of Separation Membranes and Comparison to Related Unconventional Fabrication Techniques"; Journal of Membrance Science; vol. 523; 2017; pp. 596-613.
European Office Action for EP Application No. 19210469.3, dated Jun. 6, 2023, pp. 1-4.

ADDITIVELY MANUFACTURED CANISTER FOR A NITROGEN GENERATION SYSTEM

CROSS-REFERENCE TO RELATED APPLICATION

This application is a division of U.S. application Ser. No. 16/422,368 filed May 24, 2019, the disclosure of which is incorporated herein by reference in its entirety.

BACKGROUND

Exemplary embodiments pertain to the art of nitrogen generation systems and more specifically to an additively manufactured air separation module for a nitrogen generation system of an aircraft.

A flammability reduction system (FRS), also known as a nitrogen generation system (NGS) for aircrafts comprises components that route a portion of bleed air from an engine, separate inert air from the bleed air, and deliver the inert air to the fuel tank. The inert gas displaces other existing gases in the fuel tank, creating a layer of inert gas on top of the liquid fuel. This layer reduces the flammability of the fuel tank.

One component of the NGS includes an air separation module (ASM). The ASM separates the flammable gas (oxygen) from the inert gas (nitrogen), and passes the inert gas through an outlet port to the fuel tank. Typical embodiments of currently operated NGSs utilize one or more straight canisters that contain synthetic flexible membrane fibers that separate the oxygen from the nitrogen in the engine bleed air.

BRIEF DESCRIPTION

Disclosed is a method of manufacturing an air separation module (ASM) for a nitrogen generation system (NGS), comprising: determining an at least partially nonlinear shape between opposing ends of a canister, the canister being configured to fit within an installation envelope for the ASM in the NGS and configured to have installed therein an air separating membrane; and additively manufacturing the canister.

In addition to one or more of the above disclose features and the method further comprises installing the air separating membrane in the canister.

In addition to one or more of the above disclose features or as an alternate, installing the air separating membrane in the canister includes drawing the air separating membrane from one end of the canister to the other end of the canister, and securing the air separating membrane to opposing ends of the canister.

In addition to one or more of the above disclose features, the method includes determining a diameter of the canister for installing therein the air separating membrane; and wherein additively manufacturing the canister includes additively manufacturing the canister to provide the determined diameter.

In addition to one or more of the above disclose features, or as an alternate, additively manufacturing the canister includes utilizing a selective laser sintering (SLS) process.

In addition to one or more of the above disclose features, or as an alternate, the SLS process includes utilizing thermoplastic to form the canister.

In addition to one or more of the above disclose features, or as an alternate, the shape between opposing ends is an arcuate shape.

In addition to one or more of the above disclose features, or as an alternate, the arcuate shape is one of S-shape, banana shape, or helix shape.

Further disclosed is a method of configuring an air separation module (ASM) of a nitrogen generation system (NGS), comprising: determining an at least partially nonlinear shape between opposing ends of a canister of the ASM, the canister being configured to fit within an installation envelope for the ASM in the NGS and configured have installed therein an air separating membrane, the canister being manufactured by a method including one or more of the above disclosed features.

Further disclosed is an aircraft system comprising: a fuel tank; an air separation module (ASM) of a nitrogen generation system (NGS), the ASM in fluid communication with the fuel tank and disposed within an installation envelope in the aircraft; and the ASM comprising a canister having an at least partially nonlinear shape between opposing ends.

In addition to one or more of the above disclosed features, or as an alternate, the at least partially nonlinear shape between opposing ends is one of S-shape, banana shape, or helix shape.

In addition to one or more of the above disclosed features, or as an alternate, the canister includes therein an air separating membrane.

In addition to one or more of the above disclosed features, or as an alternate, the at least partially nonlinear shape between opposing ends is also noncircular.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
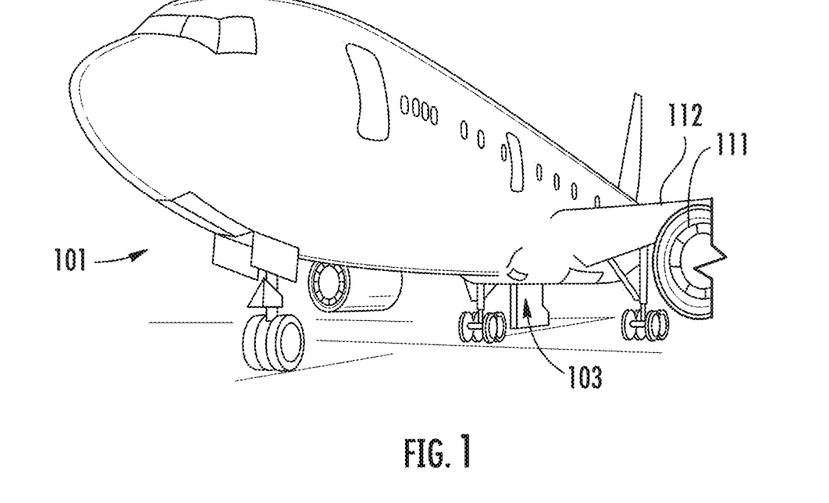
FIG. 1 is a schematic illustration of an aircraft that can incorporate various embodiments of the present disclosure.
Figure 2:
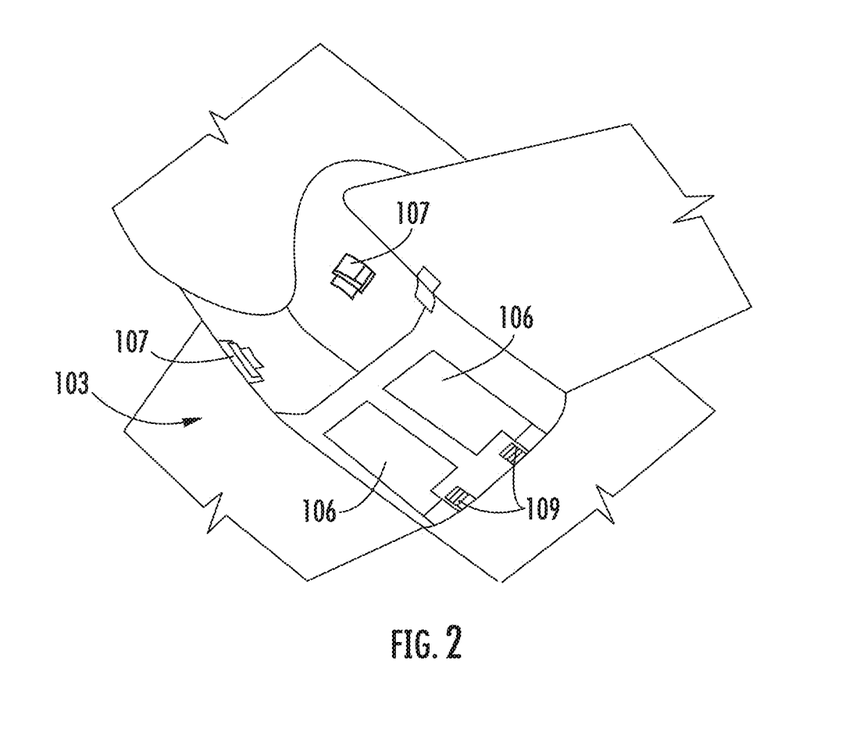
FIG. 2 is a schematic illustration of a bay section of the aircraft of FIG. 1.

As shown in FIGS. 1-2, an aircraft includes an aircraft body 101, which can include one or more bays 103 beneath a center wing box. The bay 103 can contain and/or support one or more components of the aircraft 101. For example, in some configurations, the aircraft can include environmental control systems and/or fuel inerting systems within the bay 103. As shown in FIG. 2, the bay 103 includes bay doors 105 that enable installation and access to one or more components (e.g., environmental control systems, fuel inerting systems, etc.) installed within or on the aircraft. During operation of environmental control systems and/or fuel inerting systems of the aircraft, air that is external to the aircraft can flow into one or more ram air inlets 107. The outside air (i.e., ram air) may then be directed to various system components (e.g., environmental conditioning system (ECS) heat exchangers) within the aircraft. Some air may be exhausted through one or more ram air exhaust outlets 109.

Also shown in FIG. 1, the aircraft includes one or more engines 111. The engines 111 are typically mounted on the wings 112 of the aircraft and are connected to fuel tanks (not shown) in the wings. The engines and/or fuel tanks may be located at other locations depending on the specific aircraft configuration. In some aircraft configurations, air can be bled from the engines 111 and supplied to environmental control systems and/or fuel inerting systems, as will be appreciated by those of skill in the art.

Although shown and described above and below with respect to an aircraft, embodiments of the present disclosure are applicable to any type of vehicle. For example, aircraft, military vehicles, heavy machinery vehicles, sea craft, ships, submarines, etc., may benefit from implementation of embodiments of the present disclosure. For example, aircraft and other vehicles having fire suppression systems, emergency power systems, and other systems that may electrochemical systems as described herein may include the redundant systems described herein. As such, the present disclosure is not limited to application to aircraft, but rather aircraft are illustrated and described as example and explanatory embodiments for implementation of embodiments of the present disclosure.

Figure 3:
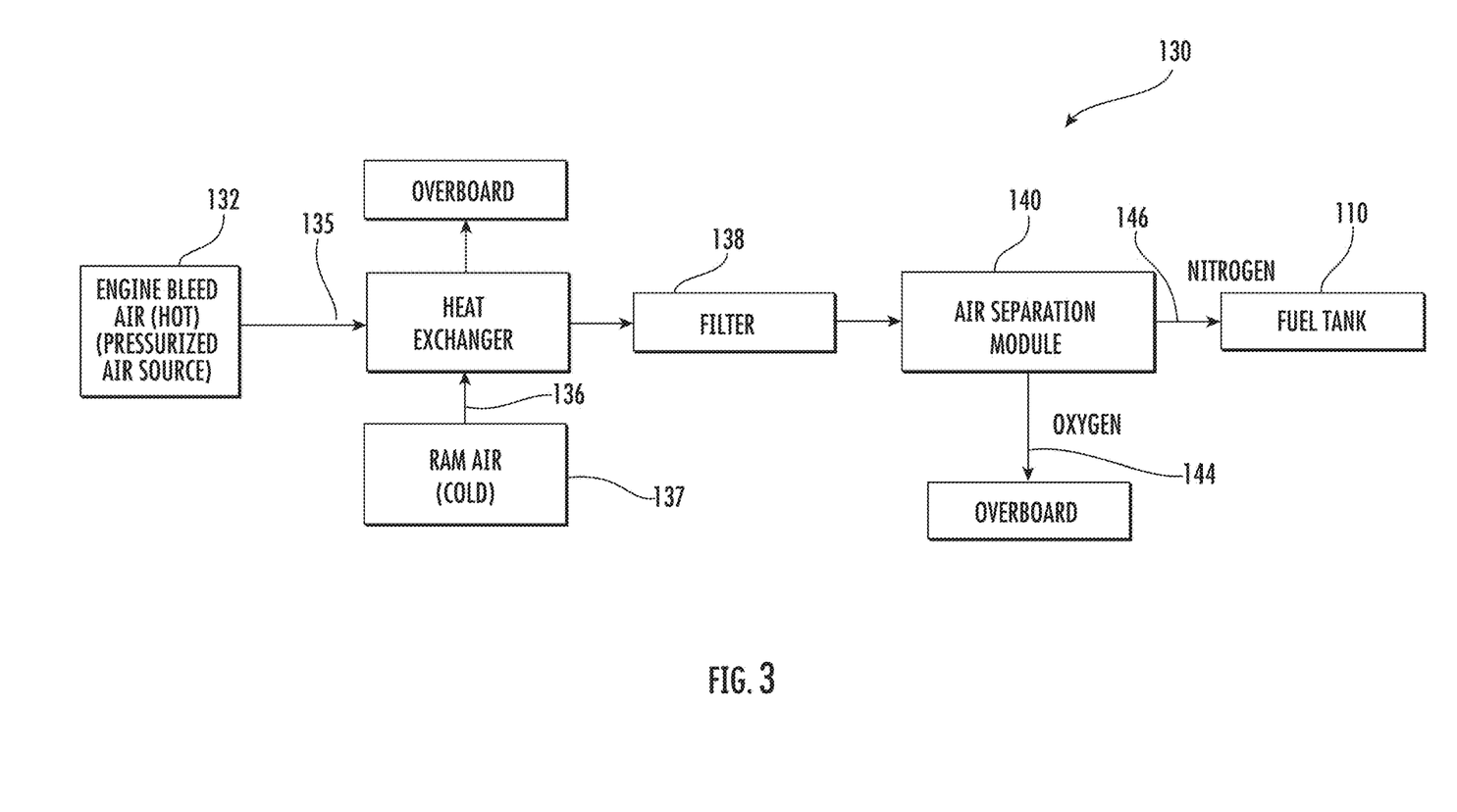
FIG. 3 is a diagram of a nitrogen generation systems (NGS) for an aircraft in which the disclosed embodiments may be utilized.

Turning to FIG. 3, a nitrogen generation system (NGS) 130 is illustrated. The NGS 130 may include a pressurized air source 132, which may bleed air 135 from the engine 111. The bleed air 135 may be conditioned using for example a heat exchanger 136 using a cooling medium such as ram air 137. The cooled air is filtered using a filter 138. An air separation module (ASM) 140 of the NGS 130 receives the conditioned and pressurized air 135 and separates the pressurized air into two gasses, one containing mostly oxygen 144 which is discarded and inert air (nitrogen-enriched air) 146. The inert air 146 may be pressure-regulated after leaving the ASM 140 and directed to the fuel tank. At the fuel tank, the inert air replaces other gases, including flammable gasses, which may be within the fuel tank.

Figure 4:
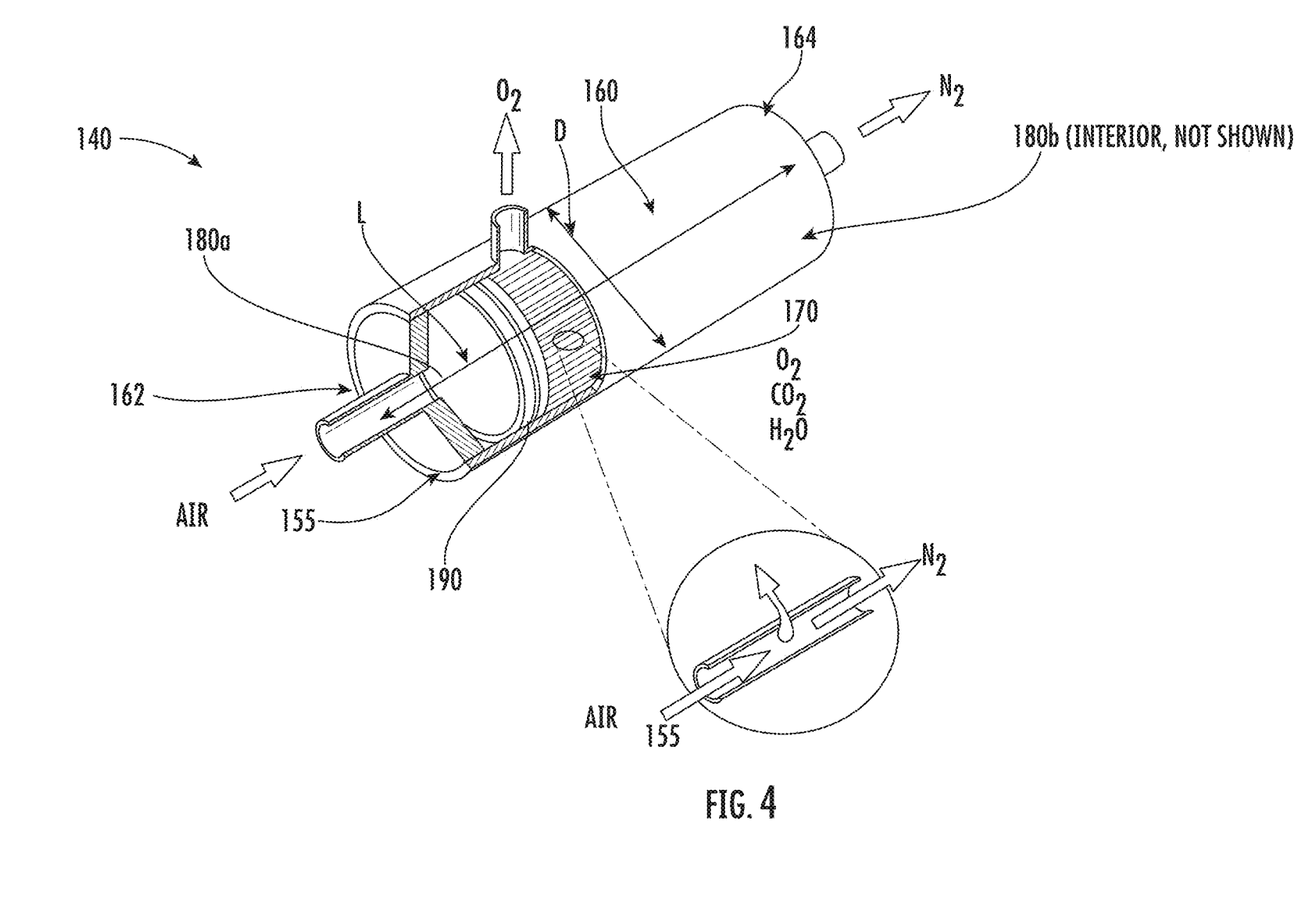
FIG. 4 illustrates air separation module and fibers in a canister for the air separation module.

Turning to FIG. 4 the ASM 140 comprises a canister generally referenced as 160. The canister 160 is formed of aluminum. The canister 160 has a linear shape and may be referred to herein as linear canister 160. The linear canister 160 may have a diameter D and length L defined by a distance between opposing ends 162, 164. In one embodiment the linear canister 160 is cylindrical. The linear canister 160 contains a flexible membrane 170 (FIG. 4). The membrane 170 separates oxygen molecules and nitrogen molecules from each other in air. In one embodiment, the membrane 170 comprises a bundle of fibrous material. Opposing ends 180a, 180b of the membrane 170, are secured to the canister 160 by a fastener such as an adhesive or other mechanical fastener. A size of a canister 160 may depend on a size of a fuel tank being treated by the ASM 140. A larger fuel tank requires a greater amount of inert air. The greater amount of inert air requires a greater amount of membrane 170, and thus a larger canister 160, or multiple canisters.

Available space for installing a canister 160 may be limited within an installation envelope in the NGS 130. The installation envelope may form a complex geometry based on aircraft structures and components, which may be driven by the airframer. Turning now to FIGS. 5a-5d, in view of the size constraints of installation envelopes typically found on aircraft disclosed herein are different configurations for a canister generally referred to as 200 that include at least partially nonlinear shape between opposing ends 202, 204. Such canister 200 may be generally referred to herein as a shaped canister 200. This can be accomplished, in one embodiment, by making the shaped canister 200 using additive manufacturing processes, or 3D printing, or the like.

Figure 5A:
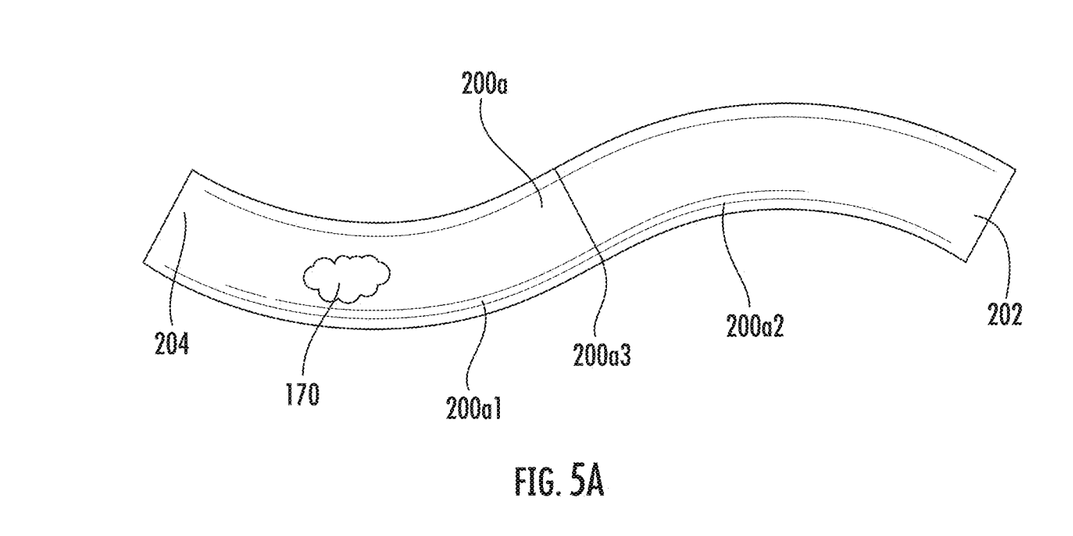
FIGS. 5a-5d illustrate different shaped canisters for an ASM according to a disclosed embodiment.
Figure 5B:
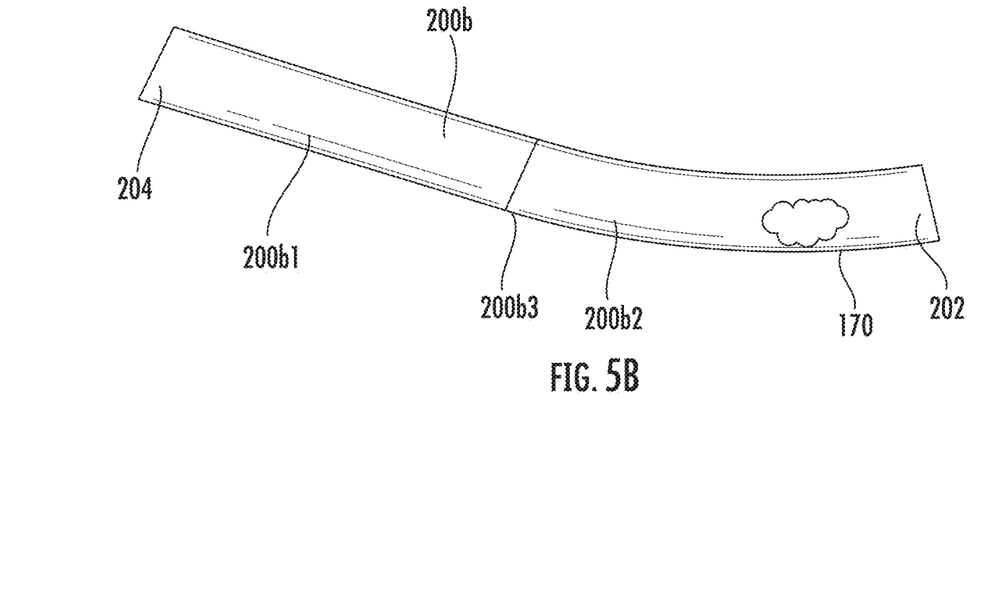

For example, one configuration for the shaped canister 200a may be an S-shape (FIG. 5a). Another configuration for the shaped canister 200b may be a banana shape (FIG. 5b). A further configuration for the shaped canister 200c-200d may be spiral or helix shape (FIGS. 5c-5d) (also referred to herein as the helical shaped canister 200c-200d).

Restrictions in the ASM 140 installation volume can reduce the size of a linear canister 160, thus reducing the capability of the NGS 130. The configurations of the shaped canister 200 in FIGS. 5a-5d provide similar to or greater internal surface area than the linear canister 160 (FIG. 4), contoured to better fit the installation envelope that the linear canister 160 cannot. Thus, dependent on the aircraft installation envelope, such configurations may increase an amount of membrane 170 that may be installed in a shaped canister 200 as opposed to a prior art linear canister 160. This is because, for example, within a same installation envelope, a rectified length (e.g., a total length along a nonlinear shape) of the shaped canister 200 of FIGS. 5a-5d may greater than the length L of the linear canister 160.

For example, a rectified length of the helical shaped canister 200c-200d (FIGS. 5c-5d) is the square root of the sum of the squared height H and the squared circumference, and wherein the circumference is the diameter of the helix DH times Pie (3.1417). If the height H of the helical shaped canister 200c-200d is equal to the length L of the linear canister 160 (FIG. 4), then the rectified length of the helical shaped canister 200c-200d is necessarily greater than the length L of the linear canister 160. If H of the helical shaped canister 200c-200d is the same as L of the linear canister 160, the surface area available for the membrane 170 in the helical shaped canister 200c-200d is greater than the surface area for the linear canister 160. This determination is based in part on the DH for the helical shaped canister 200c-200d being non-zero and the diameter D of the helical shaped canister 200c-200d and the linear canister 160 being the same.

It is to be appreciated that modifying the diameter D of the shaped canister 200 in FIGS. 5a-5d provides a further ability to increase an amount of air separating membrane 170 that may be installed in the shaped canister 200. Varying both the shape and the diameter of the shaped canister 200 to increase an amount of air separating membrane 170 within the shaped canister 200 is within the scope of the disclosed embodiments.

Figure 5C:
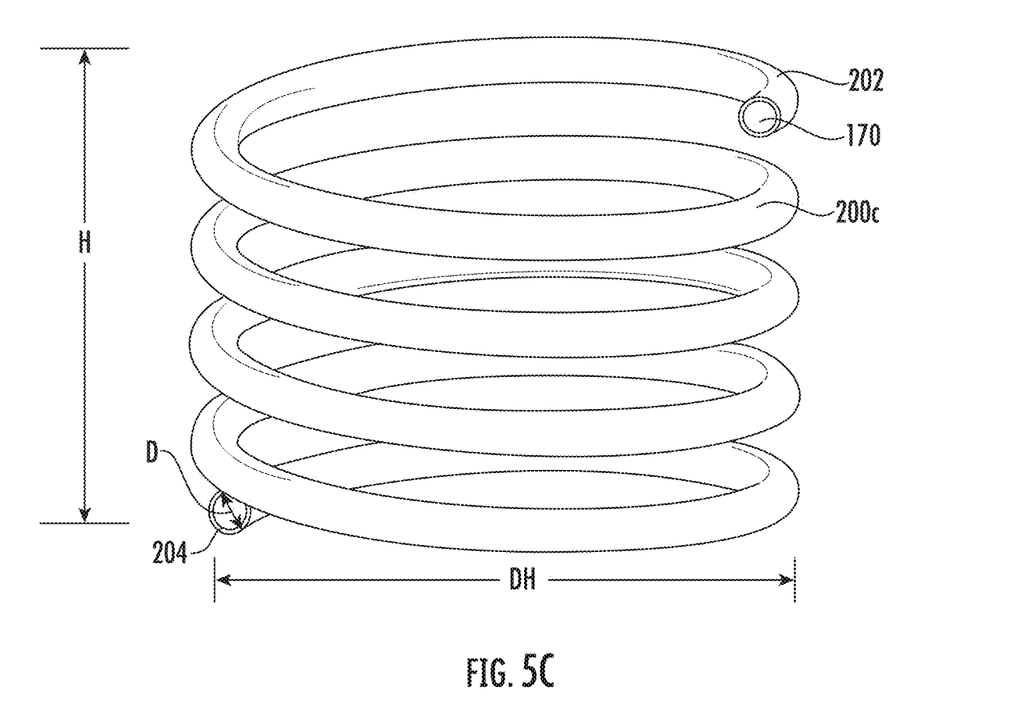
Figure 5D:
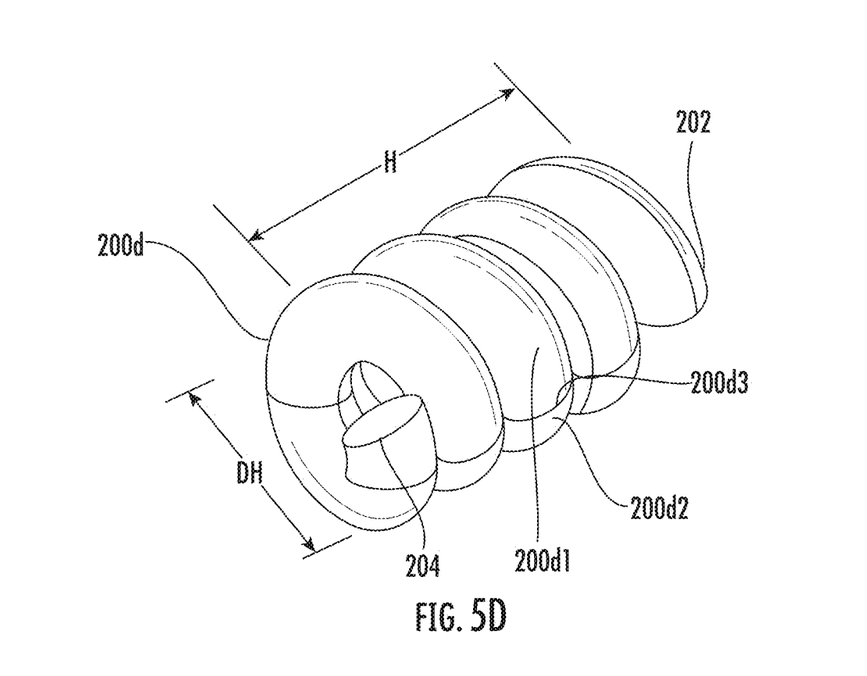

Complex shapes of the shaped canister 200 may be formed by connected canister sections which may be either linear or nonlinear. For example, the S-shape for the shaped canister 200a (FIG. 5a) may be obtained with two sections 200a1, 200a2 meeting at a junction 200a3. In this configuration, the two sections 200a1, 200a2 have opposing curve shapes to thereby form the S-shape. The banana shape for shaped canister 200b (FIG. 5b) may be obtained with two sections 200b1, 200b2 meeting at a junction 200b3. In this configuration one section 200a1 is linear and the other section 200b2 is curved to thereby form the banana shape. As illustrated in FIG. 5c, the helix-shape for the shaped canister 200c may be formed from a single section having a constant arc-curve extending between opposing ends 202, 204. In one embodiment, as illustrated in FIG. 5d, the helix-shape for the shaped canister 200d may be formed from a plurality of sections 200d1, 200d2 connected at a plurality of seams, for example 200d3, to form the integrated canister 200d.

For each configuration of the ASM 140, the shaped canister 200 includes the membrane 170. The membrane 170 may be installed by drawing the membrane 170 from one end 202 of the shaped canister 200 toward the other end 204 of the shaped canister 200. Then the membrane 170 is secured to the opposing ends of the shaped canister 200.

In an embodiment an additive process of selective laser sintering (SLS) is utilized to form the shaped canister 200. One non-limiting material for being utilized in the SLS process is a thermoplastic such as poly-ether-ketone-ketone (PEKK). Using the SLS process with a thermoplastic as a sintering material results in a relatively high strength, low weight structure for the shaped canister 200. The shaped canister 200 obtained with the SLS process may have a relatively complex shape (FIGS. 5a-5c) and be relatively light compared with an aluminum linear canister 160 (FIG. 4), and thus suitable for an ASM 140. In addition to new-build installations, an ASM 140 comprising such shaped canister 200 may be retrofitted into an NRS 130 that is part of an existing aircraft 100.

Figure 6:
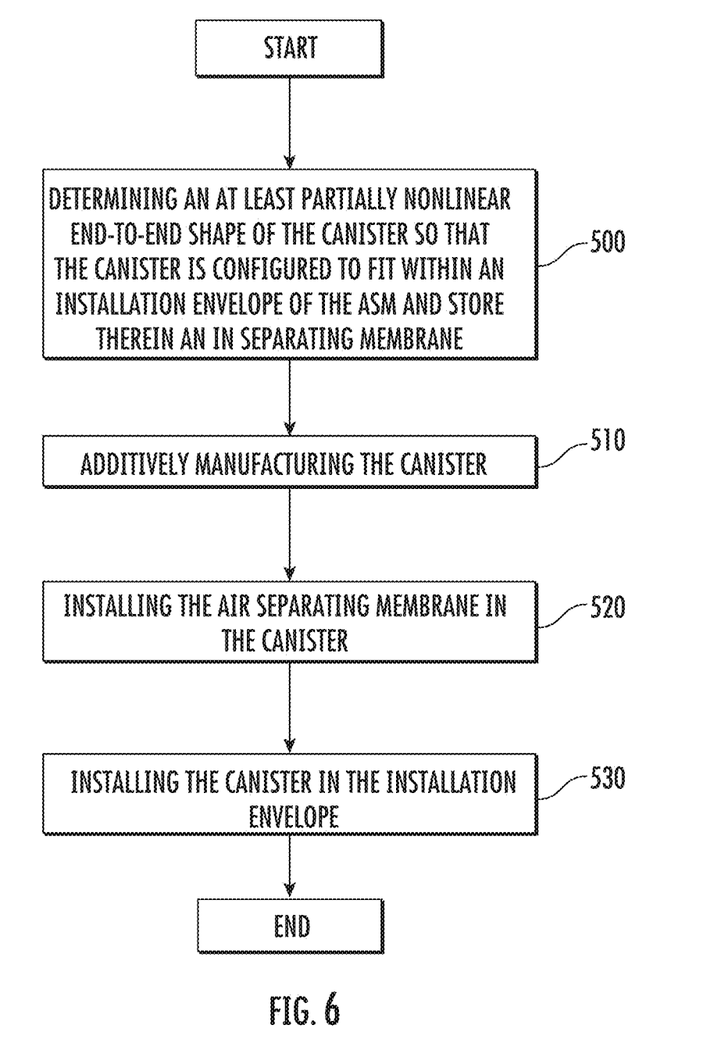
FIG. 6 illustrates a method of configuring an ASM according to an embodiment.

Turning to FIG. 6, a method is disclosed of configuring the ASM 140. The method includes block 500 of determining an at least partially nonlinear shape between opposing ends 202, 204 of the shaped canister 200. The purpose of this determination is to configure the shaped canister 200 to fit within the installation envelope of the ASM 140 and to store therein an air separating membrane 170. In one embodiment the shape between opposing ends 202, 204 is one of S-shape, banana shape, or helix shape. In one embodiment block 500 further includes determining a diameter of the shaped canister 200 for the ASM 140. Block 510 includes additively manufacturing the shaped canister 200. In one embodiment block 510 includes utilizing a selective laser sintering (SLS) process to fabricate the shaped canister 200. In one embodiment block 510 includes utilizing a thermoplastic to form the shaped canister 200. Block 520 includes installing the air separating membrane 170 in the shaped canister 200. In one embodiment block 520 includes drawing the air separating membrane 170 from one end 202 of the shaped canister 200 to the other end 204 of the shaped canister 200, and securing the air separating membrane 170 to the opposing ends 202, 204 of the shaped canister 200. At block 530, the shaped canister 200 is installed in the installation envelope for the NGS 130.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft system comprising:
   a fuel tank;
   an air separation module (ASM) of a nitrogen generation system (NGS), the ASM in fluid communication with the fuel tank and disposed within an installation envelope in the aircraft; and
   the ASM comprising an ASM canister having opposing ends, wherein the ASM canister fits within constraints of an installation envelope for the ASM in the NGS, and the ASM canister having installed therein an air separating membrane,
   wherein:
   the ASM canister, between the opposing ends, has an arcuate shape, the arcuate shape being a helix shape;
   the ASM canister has a circumference C, a diameter D and a height H, and the helix shape of the ASM canister has a helix diameter DH;
   a rectified length of the ASM canister is a square root of the sum of the height H squared and the circumference squared, and the circumference of the ASM canister is the diameter of the helix DH times $\pi$; and
   the rectified length of the ASM canister is greater than a length L of a linear canister sized to fit within the constraints of the installation envelope if the height H of the ASM canister is equal to the length L of the linear canister.

2. The system of claim 1, wherein:
   the ASM is formed via additive manufacturing.

3. The method of claim 2, wherein:
   the ASM canister is formed via an selective laser sintering (SLS) SLS process.

4. The method of claim 3, wherein:
   the SLS process includes utilizing thermoplastic to form the ASM canister.

* * * * *